United States Patent [19]

Loshaek et al.

[11] 4,228,269

[45] Oct. 14, 1980

[54] CONTACT LENSES OF HIGH GAS PERMEABILITY

[75] Inventors: Samuel Loshaek; Chah M. Shen, both of Chicago, Ill.

[73] Assignee: Wesley-Jessen Inc., Chicago, Ill.

[21] Appl. No.: 913,569

[22] Filed: Jun. 8, 1978

[51] Int. Cl.$^3$ ............................................. C08F 12/12
[52] U.S. Cl. .................... 526/346; 260/23 S; 260/30.6 R; 260/31.8 B; 260/31.8 R; 260/33.6 UA; 260/33.8 UA; 351/160 R; 526/260; 526/304; 526/306; 526/320; 526/322; 526/323.2; 526/327; 526/347
[58] Field of Search .................... 351/160 R; 526/346, 526/347, 320, 323.2, 322, 306, 260, 327, 304; 260/31.8 R, 31.8 B, 30.6, 23 S

[56] References Cited

U.S. PATENT DOCUMENTS

| | | | |
|---|---|---|---|
| 2,555,298 | 5/1951 | Sturrock et al. | 526/346 |
| 2,723,261 | 11/1955 | Levine et al. | 260/88.1 |
| 3,228,741 | 1/1966 | Becker | 351/160 |
| 3,718,383 | 2/1973 | Moore | 351/160 |
| 3,808,179 | 4/1974 | Gaylord | 260/86.1 E |
| 3,940,207 | 2/1976 | Barkdoll | 351/160 |
| 3,950,315 | 4/1976 | Cleaver | 260/86.1 E |

FOREIGN PATENT DOCUMENTS

| | | |
|---|---|---|
| 1385677 | 2/1975 | United Kingdom . |
| 1395501 | 5/1975 | United Kingdom . |
| 1436705 | 5/1976 | United Kingdom . |
| 1444110 | 7/1976 | United Kingdom . |
| 1478455 | 6/1977 | United Kingdom . |

OTHER PUBLICATIONS

"C.A.B.: A practical Contact Lens Option," Contact Lenses, 48, No. 3, (Mar., 1977).
"Oxygen Permeability Measurements," International Contact Lens Clinic, (Nov./Dec. 1977).
"Preliminary Results of the CLP.-2A Corneal Contact Lens Clinical Trial," Contact and Intraocular Lens Medical Jrl., 1, No. 4, pp. 24-33, (Oct.-Dec., 1975).

*Primary Examiner*—Stanford M. Levin
*Attorney, Agent, or Firm*—Sigalos & Levine

[57] ABSTRACT

This invention relates to bonnets for making contact lenses and contact lenses having high gas permeability shaped from a polymer selected from (a) polymers consisting essentially of the polymerization reaction products of one or a combination of different alkyl styrene monomers with one or more alkyl substituents on the aromatic ring and an unsubstituted vinyl group, and optionally at least one compatible cross-linking monomer, (b) polymers consisting essentially of the polymerization reaction products of at least one alkyl styrene monomer as defined in (a) with one or a combination of other styrene monomers selected from styrene, styrene with an alkyl substituent on the vinyl group only, and styrene with both an alkyl substituent on the vinyl group and one or more alkyl substituents on the aromatic ring, and optionally at least one compatible cross-linking monomer and (c) polymers consisting essentially of the polymerization reaction products of one of the styrenes defined in (a) and (b) or combinations thereof with at least one compatible monoolefinically unsaturated polymerizable monomer, and optionally at least one compatible cross-linking monomer.

29 Claims, No Drawings

CONTACT LENSES OF HIGH GAS PERMEABILITY

BACKGROUND OF THE INVENTION

Polymethylmethacrylate (PMMA) resins have long been used for the manufacture of contact lenses because of their excellent optical properties and machining and molding characteristics. A major disadvantage of PMMA resins is their very low permeability to gases such as oxygen present in the air and carbon dioxide that is a metabolic waste product produced by the eye. Since the cornea needs a continuous supply of oxygen from the air to provide for ongoing metabolic processes, the low gas permeability of the PMMA resins has necessitated lens designs which ameliorate this problem to some degree. Design changes have included reducing the diameter of the lenses in order to decrease the amount of corneal area covered by the impermeable material and shaping the back surface of the PMMA contact lens to provide for a pumping action and concomitant tear flow under the lens, the tears containing dissolved oxygen from the air.

While such designs have made possible the wearing of contact lenses, significant problems and limitations remain, both because of the inadequacy of the oxygen supply to the cornea and because the designs may produce discomfort and undesirable physiological symptoms to the wearer, frequently to a degree which makes wearing of the contact lens possible for only short periods of time or not at all.

Continued oxygen deprivation of the cornea results in edema or swelling of the cornea which may result in corneal damage. In addition, while oxygen must be supplied to the cornea for its metabolic processes, carbon dioxide, a waste product of these processes must be removed. The same principles apply for providing a route for removal of carbon dioxide from the cornea as for the transport of oxygen to the cornea, when a contact lens covers the cornea. As used herein, the term "gas permeable" encompasses permeation of said gases through the lens.

The ideal material would provide oxygen transport to the cornea equivalent to that without a lens present on the cornea. It has been found, however, that the cornea can remain healthy with an oxygen delivery lower than this, provided the continuous lens wear time is appropriately curtailed. It has been well established, however, that the higher the gas permeability, the greater the safety margin for retaining a healthy cornea, the greater the patient tolerance for the lens and the longer the continuous wear time of the lens by the patient.

Polymethyl methacrylate, which is the polymer of which most non-hydrophilic or rigid lenses currently in use are made, has a permeability constant (P value as hereinafter defined) of about $0.1 \times 10^{-11}$ and must have an efficient mechanical pump design to permit wear for even short periods of time. Recently, cellulose acetate butyrate with a P value of about $4 \times 10^{-11}$ has been used as a rigid contact lens material. This lens permits much longer wear than the PMMA lens, but has the disadvantage that the lens material is unstable and changes its shape. Polysiloxane rubber contact lenses have very high P values, of the order of $70-80 \times 10^{-11}$, but the surface of such lenses are very hydrophobic necessitating hydrophilic coating or surface treatments which have not been found to be permanent. Further, the polysiloxane lenses appear to enhance solid deposits thereon from the tear fluid thereby reducing optical clarity. Other recent contact lens materials such as copolymers made of methyl methacrylate and silicone methacrylate monomers (U.S. Pat. No. 3,808,178), or methyl methacrylate and fluoro methacrylate monomers (U.S. Pat. No. 3,950,315) also have enhanced P values, but suffer from lack of surface wettability and difficulty in making the polymers.

SUMMARY OF THE INVENTION

The present invention provides contact lenses which have oxygen permeability of sufficient magnitude to provide for comfortable extended wear times without the induction of substantial corneal edema. The contact lenses otherwise retain all of the desirable features of conventional non-hydrophilic lenses, such as polymethyl methacrylate lenses; readily measured parameters, predictable optics, stability, durability, minimum patient care requirements, and availability in a wide range of surface shapes and curvatures required for special refractive anomalies of the eye, such as astigmatism and presbyopia.

Briefly stated, the invention comprises bonnets for making contact lenses and contact lenses made therefrom having high gas permeability and shaped from a polymer selected from (a) homopolymers and interpolymers formed by the polymerization of an alkyl styrene monomer or a combination of different alkyl styrene monomers, respectively, wherein the alkyl styrenes have one or more alkyl substituents on the aromatic ring and the vinyl group is unsubstituted, (b) interpolymers formed by the polymerization of at least one alkyl styrene monomer of the type defined in (a) with one or more other styrene monomers selected from styrene, styrene which is unsubstituted on the aromatic ring but has an alkyl substituent on the vinyl group in the alpha position adjacent to the aromatic ring, and a styrene which has both an alkyl substituent on the vinyl group as aforementioned and one or more alkyl substituents on the aromatic ring, and (c) interpolymers formed by the polymerization of any one of the foregoing styrene monomer types or combinations thereof with at least one compatible monoolefinically unsaturated polymerizable monomer; optionally at least one compatible cross-linking monomer can be included in polymers of type (a), (b), and (c). Contact lenses having an oxygen permeability constant of at least about $1.5 \times 10^{-11}$ are provided within the scope of this invention. Examples of preferred contact lenses are those made from polymers of tertiary butyl styrene and isopropyl styrene having P values, as hereinafter defined, of about 16 and $13 \times 10^{-11}$, respectively.

DETAILED DESCRIPTION

The lenses of the present invention are significantly gas permeable, optically clear, and can be rigid, very much like PMMA or semi-rigid. As used herein, the phrase "optically clear" means the clarity usual for visual wear and optical correction; ordinarily not less than about 80% visible light transmission. Rigidity can be disadvantageous to some wearers because of reduced comfort, however, if the contact lens is well fitted rigidity will not be a factor in comfort for many individuals especially if an adequate supply of oxygen reaches the cornea so that substantial swelling, (edema) is prevented. On the other hand, the rigid lens has advantages as further described herein.

One advantage of a lens of the present invention is that it can be made with stable curved surfaces other than of spherical shape, e.g., a toric surface, because of its rigidity or semi-rigidity. Either the front or back or both surfaces can be made in non-spherical shapes. Such lenses are used to correct certain refractive abnormalities of the eye such as astigmatism.

Other advantages of the lenses of this invention are ease of lens cleaning and disinfection and ease of insertion and removal of lenses. Still another advantage is the strength, durability and long service life of such lenses. Yet another advantage of such lenses over hydrophilic or polysiloxane rubber lenses is that they can be polished and reconditioned from time to time by simple techniques.

With appropriate variations of the interpolymer composition, more flexible, semi-rigid, non-hydrophilic contact lenses can be formed therefrom. For such flexible materials a molding process may be used to mold the contact lens directly from the resin as such materials may be too soft to lathe under normal, ambient conditions. For example, flexible monomers such as the $C_2$–$C_4$ alkyl esters of acrylic acid can be incorporated into the interpolymer to produce more flexible lenses.

Also the materials and lenses of the present invention provide other attributes required in a contact lens such as adequate wettability, clarity, stability, good machineability or moldability and good polishing characteristics.

In describing the instant invention, the degree of oxygen permeability of a material is given quantitatively by its permeability constant, abbreviated as P, in suitable units such as used herein:

$$(ml\ (O_2)\cdot cm^2/sec\ ml\ mm\ Hg)$$

The amount of oxygen permeability is measured in an oxygen sensor cell conventionally used for this purpose as described in Example 1 hereof. It has been found that the permeability through the lens material of other gases of importance to the health of the eye, such as carbon dioxide, is of substantially parallel behavior to that of oxygen although the absolute magnitude of the permeability differs.

Empirical, semi-quantitative relationships have been derived which relate corneal oxygen requirement and the P value of the material of which the contact lens is made, thereby delineating materials of significant interest from the standpoint of their permeability value. A discussion of one such typical relationship follows and serves to demonstrate the significance of the materials of the instant invention. It is noted that oxygen requirements will vary among individuals and therefore the numerical values refer to the statistically predominant situation. Further, because of the empirical nature of such relationships and the variability of chemical behavior, the numerical values should be used only as a guide.

One empirical relation has been developed between the P value and the amount of oxygen reaching the cornea, the latter amount being referred to as the "equivalent oxygen percent" under the lens, abbreviated as "EOP," expressed as a percent of oxygen present in ambient air (see, for example, the Loshaek and Hill article at pages 26 to 29, International Contact Lens Clinic, Nov./Dec. 1977). Thus, with no lens present the EOP is 20.9%, which is the percent of oxygen in air. An EOP of 2% would mean that the equivalent of about 10% of the oxygen present in air reaches the cornea.

The EOP will depend on lens thickness, the thinner the lens for a given material, the greater the EOP. For the purpose of comparison of different materials, it is convenient to assume the same thickness and lens design so that only the permeability characteristics of the material are considered. It has been found empirically that the minimum oxygen requirement which will prevent sudden corneal edema corresponds to an EOP of about 2%, as discussed, for example, by Richard M. Hill in Journal of the American Optical Association, Vol. 46, No. 3, March 1977. For a typical lens of 0.2 mm. thickness this requires a contact lens with a P value of about $2 \times 10^{-11}$ and for a slightly thinner lens a P value of about $1.5 \times 10^{-11}$ would be suitable. Materials with P values in the range of $5 \times 10^{-11}$ should provide for long wearing hours during the waking hours. Materials with P values of the order of $10 \times 10^{-11}$ may permit wear during an overnight sleeping period for some individuals, provided the lens is removed as needed to permit recovery of the cornea. The permeability requirements for lens wear during sleep are greater because the closed eyelid is in itself a barrier to oxygen transport to the cornea. The lenses of this invention provide P values up to about $20 \times 10^{-11}$.

The contact lenses of the instant invention are essentially non-hydrophilic as contrasted to the soft hydrophilic lenses or hydrogel lenses as they are sometimes called. Such hydrogel lenses contain substantial amounts of bound water, e.g., by hydrogen bonding to the hydrogel polymer, and their physical properties such as softness and flexibility, etc., are primarily determined by the water content. Such hydrogel lenses are distinguishable in that they retain their size and shape only when kept in an aqueous environment. They will dry out when exposed to the ambient environment and substantially distort and change their size and shape in contrast to the lenses of the instant invention which retain their size and shape in the ordinary environment. The contact lenses of the instant invention may, however, contain minor amounts of water, which amounts are insufficient to be the prime determinant of the properties of the lens. Rather, the composition of the polymer of which the lens is made primarily determines these properties.

As to the styrene monomer, it can be styrene, a styrene substituted on the alpha carbon, styrene which is unsubstituted in the alpha position and in which there are one or more alkyl substituents on the aromatic ring, or a styrene which is substituted both on the alpha carbon and with one or more alkyl substituents on the aromatic ring.

The alkyl substituents are selected from $C_1$–$C_{10}$ alkyl groups which may be the same or different on any of the ring positions from 2 to 6. In brief, the aromatic ring can be mono- or polysubstituted, it being preferred to use styrenes that are mono-, di-, or tri-substituted on any position in the ring; i.e., with the same or a mixture of the noted groups. Thus, for example, vinyl toluene which contains a methyl substituent in the styrene ring produces on polymerization polyvinyl toluene which has a P value of about $2 \times 10^{-11}$, while a tertiary-butyl group in the styrene ring gives poly-t-butyl styrene, which has a P value of about $16 \times 10^{-11}$. The styrenes substituted on the alpha carbon atom are of the same structure except that the hydrogen on the carbon in the alpha position to the aromatic ring is replaced with a $C_1$–$C_4$ alkyl group. It has also been found, that these different styrenes can be mixed in various proportions and types to give different P values. Herein, when used without further description, the term "substituted styrene" means a styrene substituted on the aromatic ring, or alpha carbon, or both.

Examples of styrenes substituted on the alpha carbon are alpha methyl styrene, alpha ethyl styrene, and the like. As styrenes substituted on both the alpha carbon and aromatic ring examples, are α-methyl, isopropyl styrene; α-methyl, t-butyl styrene; α-methyl, ethyl styrene; and the like.

In general, any of the styrenes substituted in the alpha position are not as desirable as those styrenes unsubstituted on the alpha position because they are much more difficult to polymerize by free radical polymerization methods such as employed herein, so that higher temperatures and catalyst concentration are required. They are more readily polymerized when used in lesser amounts with other monomers so that their inhibiting effect is reduced. The resulting polymers, however, are suitable.

Specific examples of styrenes substituted on the ring only are methyl styrene (vinyl toluene), ethyl styrene, propyl styrene, butyl styrene, n-butyl styrene, t-butyl styrene, hexyl styrene, n-octyl styrene, t-octyl styrene, decyl styrene, 2,5 dimethyl styrene, 2,6 dimethyl styrene, 2,4,6 trimethyl styrene, 2,5 diethyl styrene, and tetramethyl styrene. The foregoing examples are illustrative of suitable substituted styrenes, but are not intended to limit the scope of the invention. Of all the polymers, at the present time, it is believed that the most suitable with respect to gas-permeability and other desirable contact lens properties are polymers wherein the principal monomers used are t-butyl styrene or isopropyl styrene. Styrene monomers included in the general formula set forth above will be referred to as "gas permeable" styrene monomers to distinguish them from other styrene monomers.

The olefinically unsaturated polymerizable monomer component used will depend upon the particular lens characteristics desired. This component may include styrene type monomers other than the gas permeable styrene monomers. A single monoolefinically unsaturated polymerizable monomer or combination thereof may be used.

Hydrophilic monomers may be incorporated to provide increased wettability of the interpolymer surface. Examples of one class of hydrophilic monomers are the hydroxy alkyl acrylates and methacrylates; suitable examples being hydroxyethyl methacrylate, hydroxyethyl acrylate, hydroxy-polyethoxy ethyl methacrylate and the like. Examples of another class of suitable hydrophilic monomers are the N-vinyl heterocyclic monomers, suitable examples of such monomers being N-vinyl-2 pyrrolidone, N-vinyl pyridine and N-vinyl-ε-caprolactam. Also another class of hydrophilic monomers are the polymerizable olefinic acids and amides; suitable examples being acrylic acid, methacrylic acid, itaconic acid, fumaric acid, maleic acid, crotonic acid, acrylamide, methacrylamide and N-(1,1-dimethyl-3-oxobutyl acrylamide). Another suitable group of hydrophilic monomers are the lower alkyl vinyl ethers such as methyl and ethyl vinyl ether.

Other monomers can be utilized to change the softening temperature and hardness and to improve machineability of the interpolymer. Generally, suitable hydrophobic monomers are the olefinically unsaturated polymerizable monomers with one polymerizable double bond per molecule. Suitable examples of such monomers are the linear or branched $C_1$-$C_{10}$ alkyl esters of acrylic and methacrylic acid such as methyl acrylate, ethyl acrylate, butyl acrylate, 2-ethylhexyl acrylate, methyl methacrylate, ethyl methacrylate, butyl methacrylate, cyclohexyl methacrylate, 2-ethylhexyl methacrylate, 2-ethoxyethyl methacrylate, and the like monomers. Examples of other suitable hydrophobic monomers are the vinyl ethers such as butyl vinyl ether and vinyl acetate, vinyl chloride, vinyl propionate, isoprene, vinyl carbazole, and styrene monomers other than those defined above for providing the gas permeability, including, alkoxy styrenes, e.g., methoxy and ethoxy styrene, halogenated styrenes, hydroxyalkyl styrenes, alkoxy alkyl styrenes, and polyalkoxyether styrenes.

With respect to proportions it must first be noted that the gas permeability, P, is reduced as the amount of monomer or monomers other than the gas permeable styrene monomers are increased. Therefore, it is desired to use the minimum amount of such monomer which will give the desired modification in polymer characteristics. For P values of at least about $1.5 \times 10^{-11}$, the amount of the olefinically unsaturated polymerizable monomer component in the polymer is up to about 75% by weight depending upon the particular styrene monomer in the copolymer. For P values of at least about $4 \times 10^{-11}$, the amount is 60% by weight, again dependent upon the styrene monomer used.

While suitable interpolymers may consist only of units of gas permeable styrene monomers and olefinically unsaturated polymerizable monomers as defined above, optionally a minor proportion of units derived from cross-linking monomers may also be included in the interpolymer. The cross-linking monomers may be added to harden the resulting interpolymer, to improve its machineability or stability, or both. Examples of suitable cross-linking monomers are divinyl benzene, di- and higher functionality of methacrylates and acrylates such as ethylene glycol dimethacrylate, tetraethylene glycol dimethacrylate, polyethylene glycol dimethacrylate, trimethylol propane trimethyacrylate, pentaerythritol tetramethacrylate, and allyl methacrylate, allyl itaconate, diallyl itaconate, diallyl adipate and methylenebisacrylamide. The foregoing examples of cross-linking monomers are merely illustrative and are not intended to limit the scope of the invention, and they may be used individually or in combination.

The amount of cross-linking monomer in the interpolymer, if used, is the minimum amount which will give the desired improvement in properties such as improved machineability and lens stability. Up to about 10% by weight in the interpolymer would fulfill these requirements and usually up to about 5% by weight is adequate. The precise limit of cross-linking monomer is not a critical part of the invention and the scope of the invention is not intended to be limited thereby.

It is also within the scope of the present invention to include minor amounts of plasticizer, up to 20% by weight of the total mixture of polymer and plasticizer, to increase the gas permeability or to improve the machineability or moldability if desired. Examples of suitable plasticizers are diethyl phthalate, dibutyl phthalate, diisobutyl phthalate, dihexyl phthalate, dioctyl phthalate, butylbenzyl phthalate, dodecyl phthalate, diethyl adipate, dibutyl adipate, diisobutyl adipate, dihexyl adipate, dioctyl adipate, dibutyl azelate, dihexyl azelate, dioctyl azelate, dibutyl sebacate, dioctyl sebacate, butyl benzoate, glyceryl triacetate (triacetin), glyceryl tributyrate, dibutyl citrate, tributyl citrate, chlorinated paraffins, phosphoric acid derivatives such as tributyl, triphenyl and trioctyl phosphates, epoxidized vegetable oils, such as epoxidized soybean oil, and polymeric plasticizers such as poly alpha-methyl styrene and polyesters.

The particular plasticizer chosen must be compatible with the polymer so that optical clarity is maintained under conditions of use.

In addition to the optional use of cross-linking monomers and plasticizers, other materials may be optionally included in the polymer from which the bonnets and contact lenses are made, such as coloring agents, light absorbers and the like which are sometimes used in making contact lenses, so long as these other materials do not adversely affect the desired properties of the instant bonnets and lenses made from the polymers. These materials are added in their usual proportions for their usual effects.

The polymers of the invention are preferably formed by the use of conventional free radical polymerization procedures in which the usual free radical initiators can be used. Examples are benzoyl peroxide, di-t-butyl peroxide, t-butyl perbenzoate, 2,5-dimethyl-2,5-bis(2-ethyl hexoyl peroxy)hexane, lauroyl peroxide, t-butyl hydroperoxide, azobisisobutyronitrile, disopropyl peroxydicarbonate, t-butyl-peroxypivalate, and the like. The amounts employed are conventional and are such as to give a controlled polymerization at conventional polymerization temperatures. The polymerization method and conditions (such as time and temperature), as well as the apparatus, are those conventionally employed and detailed discussion is not deemed necessary since they are well known to those skilled in the polymerization art. Moreover, these conditions are not intended to limit the scope of the present novel contact lenses.

The contact lenses can be formed from the polymer by any of the conventional lens lathing, molding and/or polishing processes. For example, the polymers can be formed into rods which are cut into small cylinders or discs (often also referred to as bonnets) from which the contact lens can be machined. In commercial practice, bonnets are often sold by one manufacturer to a second manufacturer who will then machine the bonnets to the desired optical corrections. Alternatively, the lens can be directly molded. Molding is especially preferred when the lens material is too soft or flexible to lathe at room temperature.

The wearing comfort of the contact lenses of the non-hydrogel type of this invention can be enhanced by the use of the well-known wetting solutions, cleaners, disinfectant solutions, comfort drops, and the like auxiliary materials commonly used with hard (PMMA) lenses.

The invention will be further described in connection with the following examples which are given for the purposes of illustration only and in which all percentages and parts are on a weight basis unless expressly stated to the contrary.

EXAMPLE 1

This example illustrates a typical procedure for making a bonnet and contact lens of the invention.

A mixture is prepared in a vacuum flask consisting of 99.85 parts of vinyl toluene, and 0.15 part of azobisisobutyronitrile as the polymerization initiator, and vacuum was applied for ten minutes. A suitable amount of deaerated monomer is poured into a one-inch diameter screw top glass tube within about ¼ inch from the top and capped with a polyethylene lined screw cap. The tube is placed in a constant temperature bath maintained at 50° C. for five days, then transferred to an electrically heated oven which is maintained at 70° C. for 4 hours, then at 110° C. for 18 hours, whereafter the oven is turned off and the tube containing the polymer is allowed to cool to room temperature. The glass tube is broken away leaving a rigid rod of polymer of about one inch in diameter.

The polymer product prepared as above is placed on a lathe and reduced to a uniform diameter of about ¾". Discs (known as buttons or bonnets in the contact lens industry) of ½ inch diameter are sliced on the lathe from the polymer rod. The bonnets are converted to contact lenses by the conventional lathing methods well known in the art. Optically clear contact lenses are obtained.

The permeability constant of the contact lens is measured in an oxygen consuming electrode cell, sometimes referred to as an oxygen flux meter, and described in the book entitled "Polarographic Oxygen Sensors" by I. Fatt; CRC Press, 1976. The permeability constant (P) at ambient temperature (about 23° C.) is determined to be $2.2 \times 10^{-11}$ (ml $(O_2)\cdot cm^2$/sec ml mm Hg).

Hereinafter all stated P values are in the aforesaid units and refer to measurements made at ambient temperatures.

EXAMPLE 2

The procedure of Example 1 was repeated except that the vinyl toluene is replaced, separately and in turn, with an equal weight of tertiary butyl styrene and isopropyl styrene. The resulting contact lenses, found to have P values respectively of $16 \times 10^{-11}$ and $13 \times 10^{-11}$, were optically clear.

EXAMPLE 3

The procedure of Example 1 is repeated except that the vinyl toluene is replaced with an equal weight of a mixture of 95% vinyl toluene and 5% of commercial ethylene glycol dimethacrylate. The resulting contact lens is found to have a P value of $1.7 \times 10^{-11}$.

EXAMPLE 4

The procedure of Example 1 is repeated except that vinyl toluene is replaced with an equal weight of a mixture of 99% tertiary butyl styrene and 1% of ethylene glycol dimethacrylate. The contact lens obtained is of suitable optical quality and has a P value of $16 \times 10^{-11}$.

EXAMPLE 5

The procedures of Examples 3 and 4 are repeated except that the ethylene glycol dimethacrylate is replaced, separately and in turn, with an equal weight of divinyl benzene, tetraethylene glycol dimethacrylate, polyethylene glycol dimethacrylate, trimethylol propane trimethacrylate, pentaerythritol tetramethacrylate, allyl methacrylate, allyl itaconate, diallyl itaconate, diallyl adipate and methylenebisacrylamide. In each case, the resulting contact lens has suitable optical quality and a P value of at least about $1.5 \times 10^{-11}$.

EXAMPLE 6

The procedure of Example 1 is repeated except that the vinyl toluene is replaced, separately in turn, with an equal weight of ethyl styrene, dimethyl styrene, and trimethyl styrene. In each case, a suitable contact lens with good gas permeability is obtained.

EXAMPLE 7

The procedure of Example 6 is repeated except that 5% by weight of each of the monomers is replaced, separately and in turn, with ethylene glycol dimethacrylate and each of the cross-linking monomers of Example 5. In each case, a suitable contact lens with comparable gas permeability is obtained.

EXAMPLE 8

The procedure of Example 1 was repeated except that the vinyl toluene is replaced with a mixture of 90% t-butyl styrene and 10% of dioctyl adipate. A suitable contact lens is obtained and the P value is found to be about $16 \times 10^{-11}$.

EXAMPLE 9

The procedure of Example 8 is repeated except that 1% by weight of the t-butyl styrene is replaced with ethylene glycol dimethacrylate. A slightly harder suitable contact lens was obtained and the P value is found to be about $16 \times 10^{-11}$.

EXAMPLE 10

The procedure of Example 1 is repeated except that the vinyl toluene is replaced, separately and in turn, with an equal weight of a mixture of 80% vinyl toluene and 20% tertiary butyl styrene and a mixture of 20% vinyl toluene and 80% t-butyl styrene. In each case, a suitable contact lens is obtained from the resultant interpolymers and a P value of $3 \times 10^{-11}$ is found for the polymer with 20% of t-butyl styrene and a P value of $12 \times 10^{-11}$ for the polymer with 80% t-butyl styrene.

EXAMPLE 11

The procedure of Example 10 is repeated except that 5% of the vinyl toluene/t-butyl styrene monomers is replaced with ethylene glycol dimethacrylate. In each case, a slightly harder suitable contact lens with slightly lower P values is obtained.

EXAMPLE 12

The procedure of Example 1 is followed except that the azobisisobutyronitrile is replaced, separately and in turn, with an equivalent amount of benzoyl peroxide, di-t-butyl peroxide, t-butyl perbenzoate, 2,5-dimethyl-2,5-bis(2-ethyl hexoyl peroxy)hexane, lauroyl peroxide, t-butyl hydroperoxide, diisopropyl peroxydicarbonate, and t-butyl-peroxypivalate and in each case the bath temperature is adjusted to give a smooth polymerization. In each case, suitable polymerization occurs and the desired polymer formed.

EXAMPLE 13

The procedure of Example 1 is repeated except that the vinyl toluene is replaced with an equal weight of a mixture of 20% by weight of α-methyl styrene, 79% by weight t-butyl styrene, and 1% by weight ethylene glycol dimethacrylate, the azobisisobutyronitrile is increased to 0.3 part, and the initial temperature is raised to 55° C. Contact lenses of suitable gas permeability and optical properties are prepared from the resultant polymer.

EXAMPLE 14

This example illustrates the inclusion of a hydrophilic comonomer with the styrene monomer to improve surface wettability.

A mixture of 80 parts of t-butyl styrene, 20 parts of N-vinyl pyrrolidone, and 0.15 parts of azobisisobutyronitrile is polymerized according to the method of Example 1.

The permeability constant (P) is determined to be $9.2 \times 10^{-11}$.

The wetting angle, or contact angle as it is sometimes called, of a 3 microliter drop of normal saline (0.9% by weight of sodium chloride in water) on the flat surface of a polished button made from the polymer of this example was measured at ambient temperature and was found to be 82°. Prior to measurement the button was equilibrated for 24 hours in an isotonic saline solution (0.9% sodium chloride in water). Under the same conditions of measurement, a surface of a polymethyl methacrylate button on which a drop of normal saline is placed gives a wetting angle of 76° and that of poly t-butyl styrene is 87°.

The wetting angle measurement was made on a Wesley-Jessen Contascope. The value of the wetting angle is a measure of the wettability of a surface, the smaller the angle the greater its wettability.

The contact lenses of this example and of the invention have wetting angles slightly greater than that of a PMMA contact lens and are suitable for contact lenses.

EXAMPLE 15

Example 14 is repeated with the exception that the t-butyl styrene is replaced separately and in turn with an equal weight of isopropyl styrene and styrene. A P value of $6 \times 10^{-11}$ is obtained with isopropyl styrene copolymer and $1.5 \times 10^{-11}$ for the styrene copolymer. A wetting angle of about 82° is obtained for both copolymers.

EXAMPLE 16

Example 14 is repeated except that the vinyl pyrrolidone is replaced separately and in turn with an equal weight of hydroxyethyl methacrylate, hydroxypropyl methacrylate, methoxyethyl vinyl ether, methacrylic acid, acrylic acid, itaconic acid, dimethylaminoethyl-methacrylate, acrylamide, methacrylamide and N-(1,1-dimethyl-3-oxobutyl acrylamide). In each case suitable contact lenses of good optical quality are obtained.

EXAMPLE 17

Example 14 is repeated except that one part of the vinyl pyrrolidone is replaced with one part of ethylene glycol dimethacrylate. A suitable slightly more rigid contact lens is obtained with a P value of about $8 \times 10^{-11}$ and a contact angle of about 83°. This example illustrates the inclusion of a cross-linking monomer in conjunction with a hydrophilic polymer.

EXAMPLE 18

Example 14 is repeated except that 10 parts of the vinyl pyrrolidone is replaced with 10 parts of acrylic acid. A suitable contact lens is obtained. This example illustrates the use of more than one hydrophilic monomer in combination.

EXAMPLE 19

Example 14 is repeated except that the 80 parts of t-butyl styrene are replaced with 70 parts of t-butyl styrene and 10 parts of vinyl toluene. A suitable button and contact lens was obtained. A P value of about $8 \times 10^{-11}$ and about the same wetting angle is obtained.

This example illustrates the use of a plurality of substituted styrenes with a hydrophilic monomer.

EXAMPLE 20

Example 14 is repeated except that 10 parts of the N-vinyl pyrrolidone are replaced with 10 parts of methyl methacrylate. This polymer had somewhat improved machining properties. The contact lens made from this polymer was of good optical quality and was slightly harder than the lens of Example 1. The P value of the lens was about $9 \times 10^{-11}$ and the wetting angle about 84°. This example illustrates that selected comonomers may be used to provide special contact lens properties such as improved machineability while retaining substantial gas permeability and wettability.

EXAMPLE 21

A sample disc made of the polymer of t-butyl styrene of Example 2 was subjected to a "glow discharge" by the method cited in U.S. Pat. No. 3,940,207. The wetting angle measured under the same conditions as in Example 14 was found to be 50° and the surface was very wettable. Commercial apparatus for carrying out glow discharge or plasma surface treatments are readily available.

EXAMPLE 22

Example 1 is repeated except that 30 parts of the vinyl toluene are replaced with 30 parts of alpha methyl, t-butyl styrene and the azobisisobutyronitrile is increased to 0.3 part. A P value of about $4 \times 10^{-11}$ is obtained for the contact lens.

EXAMPLE 23

Example 2 is repeated except that 20 parts of the t-butyl styrene and isopropyl styrene are replaced separately and in turn with 20 parts of ethyl acrylate and butyl acrylate. The contact lens made from this polymer has increased flexibility while retaining high gas permeability. The contact lenses in this example are made by molding in a press since the polymers are too flexible for good lathe cutting.

While the invention has been described in connection with preferred embodiments, it is not intended to limit the invention to particular forms set forth, but on the contrary, it is intended to cover such alternatives, modifications and equivalents as may be included within the spirit and scope of the invention as defined by the appended claims.

What is claimed is:

1. A contact lens having an oxygen gas permeability of at least $1.5 \times 10^{-11}$ (ml $(O_2)$ cm$^2$/sec ml mm Hg) comprising homopolymers and interpolymers formed by the polymerization of monomers comprising at least one alkyl styrene monomer having at least one $C_2$ or higher alkyl on the aromatic ring.

2. The contact lens of claim 1 wherein the polymer is a homopolymer comprising an alkyl styrene monomer having at least one $C_2$ or higher alkyl substituent on the aromatic ring.

3. The contact lens of claim 1 wherein the polymer is an interpolymer formed by reacting an alkyl styrene having at least one $C_2$ or higher alkyl substituent on the aromatic ring with at least one compatible monoolefinically unsaturated polymerizable monomer and from about 0% to 10% by weight, based on the total weight of the polymer, of at least one compatible cross-linking monomer.

4. The contact lens of claim 1 wherein reactants used in forming the polymer include up to 10% by weight, of the total weight of the polymer, of at least one compatible cross-linking monomer.

5. The contact lens of claim 1 wherein the polymer includes up to 20% by weight of at least one compatible plasticizer, based on the total weight of polymer and plasticizer.

6. The contact lens of claim 3 wherein the compatible monoolefinically unsaturated polymerizable monomer is selected from hydroxyalkyl acrylates, hydroxyalkyl methacrylates, polymerizable olefinic acids and amides, lower alkyl vinyl ethers, alkoxyalkyl vinyl ethers, N-vinyl heterocyclic monomers, vinyl carbazole, vinyl ethers, linear or branched chain $C_1$-$C_{10}$ alkyl esters of acrylic and methacrylic acid, alkoxy styrenes, halogenated styrenes, hydroxyalkyl styrenes, alkoxyalkyl styrenes, polyalkoxyether styrenes, and mixtures thereof.

7. The contact lens of claim 4 wherein the polymer includes up to 20% by weight of at least one compatible plasticizer, based on the total weight of polymer and plasticizer.

8. The contact lens of claim 1 wherein the alkyl styrene is a styrene with one or more alkyl substituents on the aromatic ring selected from $C_2$-$C_{10}$ alkyl groups which may be the same or different and in any of the ring positions 2 to 6.

9. The contact lens of claim 8 wherein the reactants used in forming the polymer include up to 10% by weight, based on the total weight of the polymer, of at least one compatible cross-linking monomer.

10. The contact lens of claim 8 wherein the polymer includes up to 20% by weight of a compatible plasticizer based on the total weight of polymer and plasticizer.

11. The contact lens of claim 2 wherein the alkyl styrene is tertiary butyl styrene.

12. The contact lens of claim 2 wherein the alkyl styrene is isopropyl styrene.

13. The contact lens of claims 11 or 12 including as a cross-linking monomer up to 5% by weight of ethylene glycol dimethacrylate, based on the total weight of the polymer including the cross-linking monomer.

14. An optically clear contact lens having an oxygen gas permeability constant from about 1.5 to $20 \times 10^{-11}$ (ml $(O_2)$ cm$^2$/sec ml mm Hg) comprising a shaped polymer consisting essentially of homopolymers and interpolymers formed by polymerization of at least one alkyl styrene monomer with 0% to 10% by weight, based on total weight of the polymer, of at least one compatible cross-linking monomer and 0% to 20% by weight of at least one compatible plasticizer, based on the weight of polymer and plasticizer, said alkyl styrene having one or more alkyl substituents on the aromatic ring selected from $C_2$ or higher alkyl groups which may be the same or different and in any of the ring positions 2 to 6.

15. The contact lens of claim 14 wherein the alkyl styrene is tertiary butyl styrene.

16. The contact lens of claim 14 wherein the alkyl styrene is isopropyl styrene.

17. The contact lens of claim 14 wherein the cross-linking monomer is selected from divinyl benzene, di- and higher functionality methacrylate and acrylate esters of polyfunctional alcohols, allyl itaconate, diallyl itaconate, diallyl adipate, and methylenebisacrylamide.

18. An optically clear, non-hydrophilic contact lens having a gas permeability constant of at least about $10 \times 10^{-11}$ (ml $(O_2)$ cm$^2$/sec ml mm Hg) comprising a polymer consisting essentially of the polymerization reaction product of 70% to 100% by weight tertiary butyl styrene monomer and, correspondingly, 0% to 10% by weight of at least one compatible cross-linking monomer, said percent by weight based on the total weight of the polymer, and 0% to 20% by weight of at least one compatible plasticizer based on the total weight of polymer and plasticizer.

19. An optically clear, non-hydrophilic contact lens having a gas permeability constant of at least about $5 \times 10^{-11}$ (ml ($O_2$) cm$^2$/sec ml mm Hg) comprising a polymer consisting essentially of the polymerization reaction product of 70% to 100% by weight isopropyl styrene monomer and, correspondingly, 0% to 10% by weight of at least one compatible cross-linking monomer, said percent by weight based on the total weight of the polymer, and 0% to 20% by weight of at least one compatible plasticizer based on the total weight of polymer and plasticizer.

20. The contact lens of claims 18 or 19 wherein the cross-linking monomer is ethylene glycol dimethacrylate.

21. A button adapted to be formed into a contact lens comprising a shaped polymer having an oxygen gas permeability of at least $1.5 \times 10^{-11}$ (ml ($O_2$) cm$^2$/sec ml mm Hg) comprising homopolymers and interpolymers formed by the polymerization of monomers comprising at least one styrene monomer having at least one $C_2$ or higher alkyl substituent on the aromatic ring with from 0% to about 20% by weight, based on the total weight of the polymer, of at least one compatible monoolefinically unsaturated polymerizable monomer, and from 0% to about 10% by weight, based on the total weight of the polymer, of at least one compatible cross-linking monomer.

22. The button of claim 21 wherein the polymer consists essentially of the polymerization reaction product of an alkyl styrene with one or more $C_2$ or higher alkyl substituents on the aromatic ring and an unsubstituted vinyl group.

23. The button of claim 21 wherein the polymer consists essentially of the polymerization reaction product of at least two different substituted styrenes, at least one of which is a styrene with one or more $C_2$ or higher alkyl substituents on the aromatic ring and an unsubstituted vinyl group.

24. An optically clear button adapted to be machined into an optically clear, non-hydrophilic contact lens having a gas permeability constant from about 1.5 to $20 \times 10^{-11}$ (ml ($O_2$) cm$^2$/sec ml mm Hg) comprising a polymer consisting essentially of homopolymers and interpolymers formed by polymerization of at least one alkyl styrene monomer with 0% to about 10% by weight, based on total weight of the polymer, of at least one compatible cross-linking monomer and 0% to about 20% by weight of at least one compatible plasticizer, based on the weight of polymer and plasticizer, said alkyl styrene having one or more alkyl substituents on the aromatic ring selected from $C_2$ or higher alkyl groups which may be the same or different and in any of the ring positions 2 to 6.

25. The button of claim 24 wherein the alkyl styrene is tertiary butyl styrene.

26. The button of claim 24, wherein the alkyl styrene is isopropyl styrene.

27. An optically clear button adapted to be machined to an optically clear, non-hydrophilic contact lens having a gas permeability of at least about $10 \times 10^{-11}$ (ml ($O_2$) cm$^2$/sec ml mm Hg) comprising a polymer consisting essentially of the polymerization reaction product of 70% to 100% by weight tertiary butyl styrene monomer and, correspondingly, about 0% to about 10% by weight of at least one compatible cross-linking monomer, said percent by weight based on the total weight of the polymer, and about 0% to 20% by weight of at least one compatible plasticizer based on the total weight of polymer and plasticizer.

28. An optically clear button adapted to be machined to an optically clear, non-hydrophilic contact lens having a gas permeability of at least about $5 \times 10^{-11}$ (ml ($O_2$) cm$^2$/sec ml mm Hg) comprising a polymer consisting essentially of the polymerization reaction product of 70% to 100% by weight isopropyl styrene monomer and, correspondingly, about 0% to about 10% by weight of at least one compatible cross-linking monomer, said percent by weight based on the total weight of the polymer, and about 0% to about 20% by weight of at least one compatible plasticizer based on the total weight of polymer and plasticizer.

29. The button of claims 27 or 28 wherein the cross-linking monomer is selected from divinyl benzene, di- and higher functionality methacrylates and acrylate esters of polyfunctional alcohols, allyl itaconate, diallyl itaconate, diallyl adipate, and methylenebisacrylamide.

* * * * *